United States Patent
Hofmann et al.

(10) Patent No.: US 10,836,858 B2
(45) Date of Patent: Nov. 17, 2020

(54) METHOD FOR PRODUCING POLYETHER CARBONATE POLYOLS

(71) Applicant: COVESTRO DEUTSCHLAND AG, Leverkusen (DE)

(72) Inventors: Jörg Hofmann, Krefeld (DE); Urs Rauwald, Düsseldorf-Benrath (DE); Stefanie Braun, Cologne (DE); Matthias Wohak, Dormagen (DE); Hartmut Nefzger, Pulheim (DE); Nicole Welsch, Cologne (DE); Aurel Wolf, Wülfrath (DE); Michael Traving, Burscheid (DE); Lars Krueger, Leverkusen (DE)

(73) Assignee: Covestro Deutschland AG, Leverkusen (DE)

(*) Notice: Subject to any disclaimer, the term of this patent is extended or adjusted under 35 U.S.C. 154(b) by 49 days.

(21) Appl. No.: 16/309,979

(22) PCT Filed: Jun. 20, 2017

(86) PCT No.: PCT/EP2017/065001
§ 371 (c)(1),
(2) Date: Dec. 14, 2018

(87) PCT Pub. No.: WO2017/220520
PCT Pub. Date: Dec. 28, 2017

(65) Prior Publication Data
US 2019/0322801 A1    Oct. 24, 2019

(30) Foreign Application Priority Data

Jun. 22, 2016 (EP) .................................... 16175835

(51) Int. Cl.
*C08G 64/34* (2006.01)
*C08G 64/02* (2006.01)
*C08G 65/26* (2006.01)

(52) U.S. Cl.
CPC .......... *C08G 64/34* (2013.01); *C08G 64/0208* (2013.01); *C08G 65/2609* (2013.01); *C08G 65/2663* (2013.01); *C08G 65/2696* (2013.01)

(58) Field of Classification Search
CPC .. C08G 64/34; C08G 64/183; C08G 65/2696; C08G 65/2663; C08G 65/2603; Y02P 20/582
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 4,145,525 A | 3/1979 | Dixon et al. | |
| 4,826,953 A | 5/1989 | Kuyper et al. | |
| 5,158,922 A | 10/1992 | Hinney et al. | |
| 5,470,813 A | 11/1995 | Le-Khac | |
| 5,536,883 A | 7/1996 | Le-Khac | |
| 5,637,673 A | 6/1997 | Le-Khac | |
| 5,714,428 A | 2/1998 | Le-Khac | |
| 5,789,626 A | 8/1998 | Le-Khac | |
| 6,018,017 A | 1/2000 | Le-Khac | |
| 6,780,813 B1 | 8/2004 | Hofmann et al. | |

(Continued)

FOREIGN PATENT DOCUMENTS

| | | |
|---|---|---|
| JP | 4145123 B2 | 9/2008 |
| WO | 03029325 A1 | 4/2003 |

OTHER PUBLICATIONS

Inoue et al., Copolymerization of Carbon Dioxide and Epoxide with Organometallic Compounds; Die Makromolekulare Chemie 130, 210-220, 1969.
M. H. Chisholm et al., Macromolecules 2002, 35, 6494.
S. D. Allen, J. Am. Chem. Soc. 2002, 124, 14284.
M. R. Kember et al., Angew. Chem., Int. Ed., 2009, 48, 931.

*Primary Examiner* — Shane Fang
(74) *Attorney, Agent, or Firm* — N. Denise Brown

(57) ABSTRACT

The invention relates to a method for producing polyether carbonate polyols by adding alkylene oxides and carbon dioxide to an H-functional starter substance in the presence of a double metal cyanide (DMC) catalyst or in the presence of a metal complex catalyst based on the metals zinc and/or cobalt, wherein ($\gamma$) alkylene oxide and carbon dioxide are added to an H-functional starter substance in a reactor with a total pressure (absolute) of 5 to 120 bar in the presence of a double metal cyanide catalyst or in the presence of a metal complex catalyst based on the metals zinc and/or cobalt, and a reaction mixture containing the polyether carbonate polyol is obtained, ($\delta$) the reaction mixture obtained in step ($\gamma$) remains in the reactor or is optionally continuously transferred to a downstream reactor at a starting total pressure (absolute) of 5 to 120 bar, the content of free alkylene oxide in the reaction mixture being reduced in the course of a downstream reaction in each case, and the total pressure (absolute) can be reduced by up to 50% during the step ($\delta$), and ($\zeta$) the content of highly volatile components of the obtained reaction mixture is thermally reduced at a temperature of 80° C. to 200° C. The invention is characterized in that ($\epsilon$) the reaction mixture resulting from step ($\delta$) is brought to a total pressure (absolute) of ≤2.0 bar, preferably 0.5 bar to 2.0 bar, particularly preferably 0.9 bar to 1.1 bar, prior to step ($\zeta$) and then left at a temperature of 80 to 180° C. for a dwell time of at least 0.5 h. After the dwell time has expired, 5 to 100 ppm of component K is added to the resulting mixture, component K being selected from at least one compound which contains a phosphorus-oxygen-hydrogen group.

15 Claims, No Drawings

(56) References Cited

U.S. PATENT DOCUMENTS

| | | |
|---|---|---|
| 6,835,687 B2 | 12/2004 | Hofmann et al. |
| 7,008,900 B1 | 3/2006 | Hofmann et al. |
| 7,304,172 B2 | 12/2007 | Coates et al. |
| 8,247,467 B2 | 8/2012 | Mijolovic et al. |
| 2012/0165549 A1 | 6/2012 | Ok et al. |
| 2014/0107245 A1 | 4/2014 | Hofmann et al. |
| 2015/0259475 A1* | 9/2015 | Muller ............... C08G 64/34 558/266 |
| 2016/0208080 A1 | 7/2016 | Laemmerhold et al. |
| 2017/0152345 A1 | 6/2017 | Hofmann et al. |

* cited by examiner

METHOD FOR PRODUCING POLYETHER CARBONATE POLYOLS

CROSS-REFERENCE TO RELATED APPLICATION

The present application is a national stage application under 35 U.S.C. § 371 of PCT/EP2017/065001, filed Jun. 20, 2017, which claims the benefit of European Application No. 16175835.4, filed Jun. 22, 2016, both of which are being incorporated by reference herein.

FIELD

The present invention relates to a process for preparing polyether carbonate polyols by catalytic copolymerization of carbon dioxide ($CO_2$) with alkylene oxides in the presence of one or more H-functional starter substances.

BACKGROUND

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e, f and g are each integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary, and it is not restricted to the polyether carbonate polyol shown in scheme (I). This reaction (see scheme (I)) is highly advantageous from an environmental standpoint since this reaction is the conversion of a greenhouse gas such as $CO_2$ to a polymer. A further product formed, actually a by-product, is the cyclic carbonate shown in scheme (I) (for example, when R=$CH_3$, propylene carbonate).

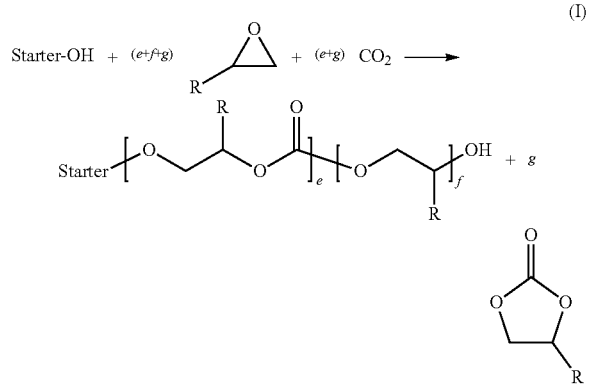

EP-A 0 222 453 discloses a process for preparing polycarbonates from alkylene oxides and carbon dioxide using a catalyst system composed of DMC catalyst and a cocatalyst such as zinc sulfate. This polymerization is initiated by one-off contacting of a portion of the alkylene oxide with the catalyst system. Only thereafter are the remaining amount of alkylene oxide and the carbon dioxide metered in simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyether carbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the extremely high pressure of 150 bar resulted in incorporation of only about 33% by weight of $CO_2$ up to a maximum of 42% by weight of $CO_2$. The accompanying examples describe the use of a solvent (toluene) which has to be removed again by thermal means after the reaction, thus resulting in increased time and cost demands. Furthermore, the polymers, with a polydispersity of 2.7 or more, have a very broad molar mass distribution.

WO-A 2008/058913 discloses a process for preparing flexible polyurethane foams exhibiting reduced emissions of organic substances, wherein the polyether carbonate polyols used have a block of pure alkylene oxide units at the chain end.

EP-A 2 530 101 discloses a process for preparing polyether carbonate polyols in which at least one alkylene oxide and carbon dioxide are reacted onto an H-functional starter substance in the presence of a DMC catalyst. However, EP-A 2 530 101 does not disclose how polyether carbonate polyols can be stabilized toward thermal stress in order to achieve a very low content of cyclic carbonate after thermal stress.

U.S. Pat. No. 4,145,525 discloses a process for thermal stabilization of polyalkylene carbonate polyols. The polyalkylene carbonate polyols disclosed in U.S. Pat. No. 4,145,525 contain alternating units of alkylene oxide and carbon dioxide. U.S. Pat. No. 4,145,525 teaches reacting at least some of the terminal hydroxyl groups of the polyalkylene carbonate polyol with a phosphorus compound reactive toward hydroxyl groups to form an oxygen-phosphorus compound. U.S. Pat. No. 4,145,525 does not disclose polyether carbonate polyols. However, the person skilled in the art does not receive any teaching from U.S. Pat. No. 4,145,525 as to how polyether carbonate polyols with a minimum content of cyclic carbonate can be prepared after thermal stress.

SUMMARY

It was an object of the present invention to provide a process for preparing polyether carbonate polyols, wherein the process leads to a product having a minimum cyclic carbonate content. It was a particular object to provide polyether carbonate polyols having a minimum cyclic carbonate content after thermal stress.

It has been found that, surprisingly, the polyether carbonate polyols obtainable by the process of the invention have a low cyclic carbonate content after thermal stress.

It has been found that, surprisingly, a polyether carbonate polyol mixture, wherein the polyether carbonate polyols are characterized in that at least 98 mol % of the polyether carbonate polyol end groups consist of a terminal block of at least two alkylene oxide units in each case, and the polyether carbonate polyol mixture contains component K, has a low cyclic carbonate content after thermal stress.

It has been found that, surprisingly, polyether carbonate polyols having a lower cyclic carbonate content compared to the prior art are obtained by a process for preparing polyether carbonate polyols by addition of alkylene oxides and carbon dioxide onto H-functional starter substance in the presence of a double metal cyanide (DMC) catalyst or in the presence of a metal complex catalyst based on the metals zinc and/or cobalt, wherein (α) optionally a portion of the H-functional starter substance and/or suspension medium containing no H-functional groups is initially charged in a reactor, in each case optionally together with DMC catalyst, (β) optionally a portion of alkylene oxide is added to the mixture from step (α) at temperatures of 90° C. to 150° C. and wherein the addition of the alkylene oxide compound is then interrupted, (γ) alkylene oxide and carbon dioxide are added onto H-functional starter substance in a reactor at a total (absolute) pressure of 5 to 120 bar in the presence of a double metal cyanide catalyst or in the presence of a metal complex catalyst based on the metals zinc and/or cobalt to obtain a reaction mixture comprising the polyether carbonate polyol, (δ) the reaction mixture obtained in step (γ) remains in the reactor or is optionally transferred continuously into a postreactor at an initial total (absolute) pressure of 5 to 120 bar, wherein the content of free alkylene oxide in the reaction mixture is reduced in each case by way of a postreaction, and wherein the total (absolute) pressure during step (δ) can decrease by up to 50%, and (ζ) the content of readily volatile constituents in the reaction mixture obtained is thermally reduced at a temperature of 80° C. to 200° C., characterized in that (ε) prior to step (ζ), the reaction mixture resulting from step (δ) is brought to a total (absolute) pressure of ≤2.0 bar, preferably 0.5 bar to 2.0 bar, more preferably 0.9 bar to 1.1 bar, and then held at a temperature of 80 to 180° C., preferably 100 to 160° C., more preferably 105 to 145° C., for a residence time of at least 0.5 h, preferably of 1.0 h to 20 h, more preferably 2.0 h to 10 h, and after this residence time has elapsed 5 to 100 ppm, preferably 5 ppm to 75 ppm, more preferably 10 ppm to 50 ppm, of component K is added to the resulting mixture, where component K is selected from at least one compound containing a phosphorus-oxygen-hydrogen group.

More particularly, a residence time in step (ε) of 2.0 h to 10 h leads to a particularly advantageous result, namely that the preparation process can be conducted with a favorable space-time yield and that the resulting polyether carbonate polyols have a low cyclic carbonate content both before and after thermal stress.

Thermal stress arising during a process for preparing polyether carbonate polyols typically occurs during purification by thermal processes such as thin film evaporation for example.

DETAILED DESCRIPTION

Optionally, step (ζ) may be followed by a further addition of at least one component K to bring the product obtained to a desired content of one or more of particular components K. For example, component K is added after step (ζ) in an amount of 10 ppm to 1000 ppm in each case.

Component K

Compounds suitable as component K are characterized in that they contain at least one phosphorus-oxygen-hydrogen group. Preferably, component K is selected from at least one compound from the group consisting of
 phosphoric acid,
 mono- and dialkyl esters of phosphoric acid,
 mono- and diaryl esters of phosphoric acid,
 mono- and dialkaryl esters of phosphoric acid,
 $(NH_4)_2HPO_4$,
 phosphonic acid,
 monoalkyl esters of phosphonic acid,
 monoaryl esters of phosphonic acid,
 monoalkaryl esters of phosphonic acid,
 phosphorous acid,
 mono- and dialkyl esters of phosphorous acid,
 mono- and diaryl esters of phosphorous acid,
 mono- and dialkaryl esters of phosphorous acid and
 phosphinic acid.

The mono- or dialkyl esters of phosphoric acid are preferably the mono- or dialkyl esters of orthophosphoric acid, mono-, di- or trialkyl esters of pyrophosphoric acid and mono-, di-, tri-, tetra- or polyalkyl esters of polyphosphoric acid, more preferably the respective esters with alcohols having 1 to 30 carbon atoms. The mono- or diaryl esters of phosphoric acid are preferably the mono- or diaryl esters of orthophosphoric acid, mono-, di- or triaryl esters of pyrophosphoric acid and mono-, di-, tri-, tetra- or polyaryl esters of polyphosphoric acid, more preferably the respective esters with alcohols having 6 to 10 carbon atoms. The mono- or dialkaryl esters of phosphoric acid are preferably the mono- or dialkaryl esters of orthophosphoric acid, mono-, di- or trialkaryl esters of pyrophosphoric acid and mono-, di-, tri-, tetra- or polyalkaryl esters of polyphosphoric acid, more preferably the respective esters with alcohols having 7 to 30 carbon atoms.

Examples of compounds suitable as component K include: diethyl phosphate, monoethyl phosphate, dipropyl phosphate, monopropyl phosphate, dibutyl phosphate, monobutyl phosphate, diphenyl phosphate, dicresyl phosphate, fructose 1,6-biphosphate, glucose 1-phosphate, bis(4-nitrophenyl) phosphate, dibenzyl phosphate, diethyl 3-butenyl phosphate, dihexadecyl phosphate, diphenyl phosphate and 2-hydroxyethyl methacrylate phosphate.

Monoalkyl esters of phosphonic acid used with preference are the respective esters with alcohols having 1 to 30 carbon atoms. Monoaryl esters of phosphonic acid used with preference are the respective esters with alcohols having 6 to 10 carbon atoms. Monoalkaryl esters of phosphonic acid used with preference are the respective esters with alcohols having 7 to 30 carbon atoms.

Mono- and dialkyl esters of phosphorous acid used with preference are esters with alcohols having 1 to 30 carbon atoms. This includes, for example, phenylphosphonic acid, butylphosphonic acid, dodecylphosphonic acid, ethylhexylphosphonic acid, octylphosphonic acid, ethylphosphonic acid, methylphosphonic acid and octadecylphosphonic acid. Mono- and diaryl esters of phosphorous acid used with preference are the respective esters with alcohols having 6 to 10 carbon atoms. Mono- and dialkaryl esters of phosphorous acid used with preference are the respective esters with alcohols having 7 to 30 carbon atoms.

Component K is more preferably selected from at least one compound from the group consisting of phosphoric acid, phosphonic acid and phosphinic acid. Component K is most preferably phosphoric acid.

The alcohols having 1 to 30 carbon atoms recited in the description of component K are for example methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, ethyl hydroxyacetate, propyl hydroxyacetate, ethyl hydroxypropionate, propyl hydroxypropionate, 1,2-ethanediol, 1,2-propanediol, 1,2,3-trihydroxypropane, 1,1,1-trimethylolpropane or pentaerythritol.

Also suitable as component K are compounds of phosphorus that can form one or more phosphorus-oxygen-hydrogen groups by reaction with OH-functional compounds (such as water for example). Examples of such compounds of phosphorus that are useful include phosphorus(V) sulfide, phosphorus tribromide, phosphorus trichloride and phosphorus triiodide.

It is also possible to use any desired mixtures of the aforementioned compounds as component K. Component K can also be used in admixture with suspension medium or in admixture with trialkyl phosphate (in particular triethyl phosphate).

Step (α):

The process of the invention for preparing polyether carbonate polyols by addition of alkylene oxides and carbon dioxide onto H-functional starter substance may comprise step (α) especially when the process is conducted in the presence of a double metal cyanide (DMC) catalyst.

The portion of the H-functional starter substance optionally used in step (α) may comprise component K, for example in an amount of at least 100 ppm, preferably of 100 to 10 000 ppm.

In the process of the invention, it is possible first to initially charge the reactor with a portion of the H-functional starter substance and/or a suspension medium containing no H-functional groups. Subsequently, the amount of DMC catalyst required for the polyaddition, preferably in unactivated form, is added to the reactor. The sequence of addition is not crucial. It is also possible to charge the reactor first with the DMC catalyst and then with the suspension medium. Alternatively, it is also possible first to suspend the DMC catalyst in the inert suspension medium and then to charge the reactor with the suspension. The suspension medium provides a sufficient heat transfer area with the reactor wall or cooling elements installed in the reactor, such that the heat of reaction released can be removed very efficiently. Moreover, the suspension medium, in the event of a cooling failure, provides heat capacity, such that the temperature in this case can be kept below the breakdown temperature of the reaction mixture.

The suspension media used in accordance with the invention do not contain any H-functional groups. Suitable suspension media are all polar aprotic, weakly polar aprotic and nonpolar aprotic solvents, none of which contain any H-functional groups. The suspension media used may also be a mixture of two or more of these suspension media. The following polar aprotic solvents are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Likewise suitable as suspension media used in accordance with the invention are aliphatic lactones, aromatic lactones, lactides, cyclic carbonates having at least three optionally substituted methylene groups between the oxygen atoms of the carbonate group, aliphatic cyclic anhydrides and aromatic cyclic anhydrides.

Aliphatic or aromatic lactones in the context of the invention are cyclic compounds containing an ester bond in the ring, preferably 4-membered lactone rings such as β-propiolactone, β-butyrolactone, β-isovalerolactone, β-caprolactone, β-isocaprolactone, β-methyl-β-valerolactone, 5-membered lactone rings such as γ-butyrolactone, γ-valerolactone, 5-methylfuran-2(3H)-one, 5-methylidene-dihydrofuran-2(3H)-one, 5-hydroxyfuran-2(5H)-one, 2-benzofuran-1(3H)-one and 6-methyl-2-benzofuran-1(3H)-one, 6-membered lactone rings such as δ-valerolactone, 1,4-dioxan-2-one, dihydrocoumarin, 1H-isochromen-1-one, 8H-pyrano[3,4-b]pyridine-8-one, 1,4-dihydro-3H-isochromen-3-one, 7,8-dihydro-5H-pyrano[4,3-b]pyridine-5-one, 4-methyl-3,4-dihydro-1H-pyrano[3,4-b]pyridine-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered lactone rings, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, lactone rings having higher numbers of members, such as (7E)-oxacycloheptadec-7-en-2-one.

Particular preference is given to ε-caprolactone and dihydrocoumarin.

Lactides in the context of the invention are cyclic compounds containing two or more ester bonds in the ring, preferably glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-diones, 3,6-di(but-3-en-1-yl)-1,4-dioxane-2,5-dione (in each case inclusive of optically active forms). Particular preference is given to L-lactide.

Cyclic carbonates having at least three optionally substituted methylene groups between the oxygen atoms of the carbonate group are preferably trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Cyclic anhydrides are preferably succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof, glutaric anhydride, diglycolic anhydride, 1,8-naphthalic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3 [(2E)-but-2-en-1-yl]dihydrofuran-2,5-dione. Particular preference is given to succinic anhydride, maleic anhydride and phthalic anhydride.

The suspension medium used may also be a mixture of two or more of the suspension media mentioned. Most preferably, the suspension medium used in step (α) is at least one compound selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-dimethyl-1,4-dioxane-2,5-dione, succinic anhydride, maleic anhydride and phthalic anhydride.

In one embodiment of the invention, in step (α), a suspension medium containing no H-functional groups is initially charged in the reactor, optionally together with DMC catalyst, without including any H-functional starter substance in the initial reactor charge. Alternatively, it is also possible in step (α) to initially charge the reactor with a suspension medium containing no H-functional groups, and additionally a portion of the H-functional starter substance(s) and optionally DMC catalyst.

The DMC catalyst is preferably used in an amount such that the content of DMC catalyst in the reaction product resulting after step (γ) is 10 to 10 000 ppm, more preferably 20 to 5000 ppm and most preferably 50 to 500 ppm.

In a preferred embodiment, in step (α), inert gas (for example argon or nitrogen), an inert gas/carbon dioxide mixture or carbon dioxide is introduced into the resulting mixture (i) of a portion of the H-functional starter substance and/or suspension medium and (ii) DMC catalyst at a temperature of 90° C. to 150° C., more preferably of 100° C. to 140° C., and at the same time a reduced pressure (absolute) of 10 mbar to 800 mbar, more preferably of 50 mbar to 200 mbar, is applied.

In an alternative preferred embodiment, in step (α), the resulting mixture (i) of a portion of the H-functional starter substance(s) and/or suspension medium and (ii) DMC catalyst is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the positive pressure is reduced in each case to about 1 bar (absolute).

The DMC catalyst can be added in solid form or as a suspension in a suspension medium or in a mixture of at least two suspension media.

In a further preferred embodiment, in step (α), (α-I) a portion of the H-functional starter substance and/or suspension medium is initially charged and (α-II) the temperature of the portion of the H-functional starter substance and/or the suspension medium is brought to 50 to 200° C., preferably 80 to 160° C., more preferably 100 to 140° C., and/or the pressure in the reactor is lowered to less than 500 mbar, preferably 5 mbar to 100 mbar, in the course of which an inert gas stream (for example of argon or nitrogen), an inert gas/carbon dioxide stream or a carbon dioxide stream is optionally passed through the reactor, wherein the double metal cyanide catalyst is added to the portion of the H-functional starter substance and/or suspension medium in step (α-I) or immediately thereafter in step (α-II), and wherein the suspension medium does not contain any H-functional groups.

Step (β):

Step (β) serves to activate the DMC catalyst and thus relates to the embodiment of the process of the invention in the presence of a DMC catalyst. This step (β) can optionally be conducted under inert gas atmosphere, under an atmosphere composed of an inert gas/carbon dioxide mixture or under a carbon dioxide atmosphere. Activation in the context of this invention refers to a step in which a portion of alkylene oxide is added to the DMC catalyst suspension at temperatures of 90° C. to 150° C. and then the addition of the alkylene oxide is stopped, with observation of evolution of heat caused by a subsequent exothermic chemical reaction, which can lead to a temperature peak ("hotspot"), and of a pressure drop in the reactor caused by the conversion of alkylene oxide and possibly $CO_2$. The process step of activation is the period from addition of the portion of alkylene oxide, optionally in the presence of $CO_2$, to the DMC catalyst until evolution of heat occurs. Optionally, the portion of the alkylene oxide can be added to the DMC catalyst in a plurality of individual steps, optionally in the presence of $CO_2$, and then the addition of the alkylene oxide can be stopped in each case. In this case, the process step of activation comprises the period from the addition of the first portion of alkylene oxide, optionally in the presence of $CO_2$, to the DMC catalyst until the occurrence of the evolution of heat after addition of the last portion of alkylene oxide. In general, the activation step may be preceded by a step for drying the DMC catalyst and optionally the H-functional starter substance at elevated temperature and/or reduced pressure, optionally with passage of an inert gas through the reaction mixture.

One or more alkylene oxides (and optionally the carbon dioxide) can in principle be metered in in different ways.

Commencement of metered addition may be effected from the vacuum or at a preselected supply pressure. The supply pressure is preferably established by introduction of an inert gas (for example nitrogen or argon) or of carbon dioxide, where the pressure (in absolute terms) is 5 mbar to 100 bar, preferably 10 mbar to 50 bar and by preference 20 mbar to 50 bar.

In a preferred embodiment, the amount of one or more alkylene oxides used in the activation in step ($\beta$) is 0.1 to 25.0% by weight, preferably 1.0 to 20.0% by weight, especially preferably 2.0 to 16.0% by weight (based on the amount of suspension medium used in step ($\alpha$)). The alkylene oxide can be added in one step or in two or more portions. Preferably, after addition of a portion of the alkylene oxide, the addition of the alkylene oxide is stopped until the occurrence of evolution of heat and only then is the next portion of alkylene oxide added. Also preferred is a two-stage activation (step $\beta$), wherein ($\beta$1) in a first activation stage a first portion of alkylene oxide is added under inert gas atmosphere and ($\beta$2) in a second activation stage a second portion of alkylene oxide is added under carbon dioxide atmosphere.

Step ($\gamma$):

The metered addition of the H-functional starter substance, alkylene oxide and optionally also of the carbon dioxide can be effected simultaneously or sequentially (in portions); for example, it is possible to add the total amount of carbon dioxide, the amount of H-functional starter substances and/or the amount of alkylene oxides metered in in step ($\gamma$) all at once or continuously. The term "continuous" as used here can be defined as a mode of addition of a reactant such that a concentration of the reactant effective for the copolymerization is maintained, meaning that, for example, the metered addition can be effected with a constant metering rate, with a varying metering rate or in portions.

It is possible, during the addition of the alkylene oxide and/or the H-functional starter substances, to increase or lower the $CO_2$ pressure gradually or stepwise or to leave it constant. Preferably, the total pressure is kept constant during the reaction by metered addition of further carbon dioxide. The metered addition of alkylene oxide and/or of H-functional starter substance is effected simultaneously or sequentially with respect to the metered addition of carbon dioxide. It is possible to meter in the alkylene oxide at a constant metering rate, or to increase or lower the metering rate gradually or stepwise, or to add the alkylene oxide in portions. The alkylene oxide is preferably added to the reaction mixture at a constant metering rate. If two or more alkylene oxides are used for synthesis of the polyether carbonate polyols the alkylene oxides may be metered in individually or as a mixture. The metered addition of the alkylene oxides or the H-functional starter substances can be effected simultaneously or sequentially (in portions) via separate feeds (additions) in each case or via one or more feeds, in which case the alkylene oxide or the H-functional starter substances can be metered in individually or as a mixture. It is possible via the manner and/or sequence of the metered addition of the H-functional starter substances, the alkylene oxides and/or the carbon dioxide to synthesize random, alternating, block or gradient polyether carbonate polyols.

In a preferred embodiment, in step ($\gamma$), the metered addition of the H-functional starter substance is terminated at a juncture prior to the addition of the alkylene oxide.

Preferably, an excess of carbon dioxide is used, based on the calculated amount of carbon dioxide incorporated in the polyether carbonate polyol, since an excess of carbon dioxide is advantageous because of the low reactivity of carbon dioxide. The amount of carbon dioxide can be fixed via the total pressure under the respective reaction conditions. An advantageous total (absolute) pressure for the copolymerization for preparation of the polyether carbonate polyols has been found to be the range from 5 to 120 bar, preferably 8 to 110 bar, more preferably from 10 to 100 bar. It is possible to feed in the carbon dioxide continuously or discontinuously. This depends on how quickly the alkylene oxides are consumed and whether the product is supposed to contain any $CO_2$-free polyether blocks. The amount of the carbon dioxide (reported as pressure) can likewise vary in the course of addition of the alkylene oxides. $CO_2$ may also be added to the reactor as a solid and then converted to the gaseous, dissolved, liquid and/or supercritical state under the chosen reaction conditions.

One feature of a preferred embodiment of the process of the invention is that in step ($\gamma$) the total amount of the H-functional starter substance is added. This addition can be effected at a constant metering rate, with a varying metering rate, or in portions.

For the process of the invention, it has additionally been found that the copolymerization (step ($\gamma$)) for preparation of the polyether carbonate polyols is conducted advantageously at 50° C. to 150° C., preferably at 60° C. to 145° C., more preferably at 70° C. to 140° C. and most preferably at 90° C. to 130° C. If temperatures below 50° C. are set, the reaction generally becomes very slow. At temperatures above 150° C., the amount of unwanted by-products rises significantly.

The metered addition of the alkylene oxide, the H-functional starter substance and the DMC catalyst can be effected via separate or combined metering points. In a preferred embodiment, the alkylene oxide and the H-functional starter substance are fed continuously into the reaction mixture via separate metering points. This addition of the H-functional starter substance can be effected in the form of a continuous metered addition to the reactor or in portions.

Steps ($\alpha$), ($\beta$) and ($\gamma$) can be conducted in the same reactor or each separately in different reactors. Particularly preferred reactor types are: tubular reactors, stirred tanks, loop reactors.

Polyether carbonate polyols can be prepared in a stirred tank, in which case the stirred tank, according to the embodiment and mode of operation, is cooled via the reactor jacket, internal cooling surfaces and/or cooling surfaces within a pumped circulation system. Both in semi-batchwise application, in which the product is not removed until after the end of the reaction, and in continuous application, in which the product is removed continuously, particular attention should be paid to the metering rate of the alkylene oxide. This should be set such that, in spite of the inhibiting action of the carbon dioxide, the alkylene oxides are depleted quickly enough. The concentration of free alkylene oxides in the reaction mixture during the activation step (step $\beta$) is preferably >0% to 100% by weight, more preferably >0% to 50% by weight, most preferably >0% to 20% by weight (based in each case on the weight of the reaction mixture). The concentration of free alkylene oxides in the reaction mixture during the reaction (step $\gamma$) is preferably >0% to 40% by weight, more preferably >0% to 25% by weight, most preferably >0% to 15% by weight (based in each case on the weight of the reaction mixture).

In a preferred embodiment, the mixture comprising activated DMC catalyst that results from steps ($\alpha$) and ($\beta$) is reacted further in the same reactor with one or more alkylene oxide(s), one or more starter substance(s) and carbon dioxide. In a further preferred embodiment, the mixture comprising activated DMC catalyst that results from steps (α) and (β) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising activated DMC catalyst that results from steps (α) and (β), one or more H-functional starter substance(s), one or more alkylene oxide(s) and carbon dioxide are pumped continuously through a tube. The molar ratios of the co-reactants vary according to the desired polymer. In a preferred embodiment carbon dioxide is metered in in its liquid or supercritical form to achieve optimal miscibility of the components. It is advantageous to install mixing elements for better mixing of the co-reactants as are marketed for example by Ehrfeld Mikrotechnik BTS GmbH or mixer-heat exchanger elements which simultaneously improve mixing and heat removal.

Loop reactors can likewise be used for preparation of polyether carbonate polyols. These generally include reactors with recycling of matter, for example a jet loop reactor, which can also be operated continuously, or a tubular reactor configured in the form of a loop with suitable apparatuses for circulation of the reaction mixture, or a loop of several series-connected tubular reactors. The use of a loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture).

Preferably, the polyether carbonate polyols are prepared in a continuous process which comprises both a continuous copolymerization and a continuous addition of the one or more H-functional starter substance(s).

The invention therefore also provides a process wherein, in step (γ), H-functional starter substance, alkylene oxide and DMC catalyst are metered continuously into the reactor in the presence of carbon dioxide ("copolymerization") and wherein the resulting reaction mixture (comprising the reaction product) is removed continuously from the reactor. Preferably, in step (γ), the DMC catalyst is added continuously in suspension in H-functional starter substance.

For example, for the continuous process for preparing the polyether carbonate polyols in steps (α) and (β), a mixture containing activated DMC catalyst is prepared, then, in step (γ),
(γ1) a portion each of H-functional starter substance, alkylene oxide and carbon dioxide are metered in to initiate the copolymerization, and
(γ2) during the progress of the copolymerization, the remaining amount of each of DMC catalyst, H-functional starter substance and alkylene oxide is metered in continuously in the presence of carbon dioxide, with simultaneous continuous removal of resulting reaction mixture from the reactor.

In step (γ), the DMC catalyst is preferably added in a suspension in the H-functional starter substance, the amount preferably being chosen such that the content of DMC catalyst in the reaction product resulting in step (γ) is 10 to 10 000 ppm, more preferably 20 to 5000 ppm and most preferably 50 to 500 ppm.

Preferably, steps (α) and (β) are performed in a first reactor, and the resulting reaction mixture is then transferred into a second reactor for the copolymerization of step (γ). However, it is also possible to perform steps (α), (β) and (γ) in one reactor.

It has also been found that, surprisingly, the process of the present invention can be used for preparation of large amounts of the polyether carbonate polyol, in which case a DMC catalyst activated according to steps (α) and (β) in a portion of the H-functional starter substance and/or in suspension medium is initially used, and the DMC catalyst is added without prior activation during the copolymerization (γ).

A particularly advantageous feature of the preferred embodiment of the present invention is thus the ability to use "fresh" DMC catalysts without activation for the portion of DMC catalyst which is added continuously in step (γ). An activation of DMC catalysts to be performed analogously to step (β) entails not just additional attention from the operator, thus resulting in an increase in manufacturing costs, but also requires a pressure reaction vessel, thus also resulting in an increase in the capital costs in the construction of a corresponding production plant. Here, "fresh" DMC catalyst is defined as unactivated DMC catalyst in solid form or in the form of a slurry in H-functional starter substance or in suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalyst can be fed in in a truly continuous manner or in relatively closely spaced increments. Equally, a continuous addition of starter can be effected in a truly continuous manner or in increments. There would be no departure from the present process in adding a DMC catalyst or reactants incrementally such that the concentration of the materials added drops essentially to zero for a period of time before the next incremental addition. However, it is preferable for the DMC catalyst concentration to be kept substantially at the same concentration during the main portion of the course of the continuous reaction, and for starter substance to be present during the main portion of the copolymerization process. An incremental addition of DMC catalyst and/or reactant which essentially does not affect the nature of the product is nevertheless "continuous" in that sense in which the term is being used here. It is possible, for example, to provide a recycling loop in which a portion of the reacting mixture is recycled to a prior point in the process, thus smoothing out discontinuities caused by incremental additions.

Step (δ)

In step (δ), the reaction mixture obtained in step (γ), generally containing a content of 0.05% by weight to 10% by weight of alkylene oxide, can be subjected to a postreaction in the reactor or can be continuously transferred into a postreactor for postreaction, with reduction of the free alkylene oxide content by way of postreaction. In step (δ), by way of postreaction, the free alkylene oxide content is preferably reduced to less than 0.5 g/L, more preferably to less than 0.1 g/L, in the reaction mixture.

When the reaction mixture obtained in step (γ) remains in the reactor at an initial total (absolute) pressure of 5 to 120 bar, the reaction mixture is preferably kept at a temperature of 60° C. to 140° C. for 10 min to 24 h, more preferably at a temperature of 80° C. to 130° C. for 1 h to 12 h, for postreaction. The reaction mixture is preferably stirred for this period until the free alkylene oxide content has fallen to less than 0.5 g/L, more preferably to less than 0.1 g/L, in the reaction mixture. The consumption of free alkylene oxide and optionally carbon dioxide generally causes the pressure in the reactor to fall during the postreaction in step (δ) until a constant value has been achieved, and the total (absolute) pressure during step (δ) can decrease by up to 50%.

The postreactor used may, for example, be a tubular reactor, a loop reactor or a stirred tank. The pressure in this postreactor is preferably at an initial total (absolute) pressure of 5 to 120 bar, preferably at the same pressure as in the reaction apparatus in which the reaction step (γ) is conducted. However, the pressure chosen in the downstream reactor may also be higher or lower. In a further preferred embodiment, the carbon dioxide is partly discharged after reaction step (γ) and the downstream reactor is operated at a slight positive pressure. The temperature in the downstream reactor is preferably 50 to 150° C. and more preferably 80 to 140° C.

The postreactor used is preferably a tubular reactor, it being possible to use, for example, a single tubular reactor or else a cascade of a plurality of tubular reactors arranged in parallel or in a linear series arrangement. The residence time in the tubular reactor is preferably between 5 min and 10 h, more preferably between 10 min and 5 h.

In one possible embodiment of the invention, in addition to step (ε), during the postreaction (step (δ)), component K is added in an amount of 5 ppm to 1000 ppm, more preferably 10 ppm to 500 ppm, most preferably 20 ppm to 200 ppm, based in each case on the reaction mixture obtained in step (γ). Component K is added during the postreaction more preferably at a free alkylene oxide content of 0.1 g/L to 10 g/L, most preferably of 1 g/L to 10 g/L, alkylene oxide and most especially preferably of 5 g/L to 10 g/L. When conducting the process of the invention using a tubular reactor for the postreaction in step (δ), component K is more preferably metered in in the second half of the distance that the reaction mixture traverses in the tubular reactor.

Step (ε)

The process of the invention is characterized in that, prior to step (ζ), the reaction mixture resulting from step (δ) is brought to a total (absolute) pressure of ≤2.0 bar, preferably 0.5 bar to 2.0 bar, more preferably 0.9 bar to 1.1 bar, and then held at a temperature of 80 to 180° C., preferably 100 to 160° C., more preferably 105 to 145° C., for a residence time of at least 0.5 h, preferably of 1.0 h to 20 h, more preferably 2.0 h to 10 h, and after this residence time has elapsed 5 to 100 ppm, preferably 5 ppm to 75 ppm, more preferably 10 ppm to 50 ppm, of component K is added to the resulting mixture, where component K is selected from at least one compound containing a phosphorus-oxygen-hydrogen group.

The residence time step can be conducted either continuously or batchwise, preference being given to a continuous mode of operation. For the apparatus implementation, any residence time volume is an option, for example in containers, vessels, tanks, reactors, columns or heat exchangers of corresponding dimensions, and combinations thereof. In this context, the degree of backmixing or effects such as short-circuit flow in the apparatus should be minimized via the construction-related boundary conditions, for example the degree of slimness (i.e. the ratio of fill height to diameter) of the apparatus chosen and/or the conditions in the region of the feeding of the reaction mixture into the apparatus. Adjustment of the temperature of the reaction mixture during the residence time is achieved via heating of the apparatus wall, additional temperature-controllable internals and/or heat exchangers integrated in the product stream. A continuous mode of operation can additionally also be conducted in one or more tubes with corresponding temperature control via the tube jacket and/or additional temperature-controllable internals. In the continuous case, the abovementioned residence time should be determined as the quotient of liquid volume utilized in the residence time vessel [in m$^3$ or kg] and throughput of reaction mixture [in m$^3$/h or kg/h].

Step (ζ)

The content of readily volatile constituents in the reaction mixture obtained is thermally reduced at a temperature of 80° C. to 200° C. This is effected after the residence time in step (ε).

Thermal reduction of the level of volatile constituents may be accomplished using the methods that are common knowledge to those skilled in the art from the prior art. For example, the thermal reduction of the volatile constituents can be achieved by thin-film evaporation, short-path evaporation or falling-film evaporation, which is preferably effected under reduced pressure (vacuum). In addition, it is also possible to use conventional distillation processes in which the polyether carbonate polyol is heated to a temperature of 80° C. to 200° C. in a flask or a stirred tank for example and the readily volatile constituents are distilled off overhead. The efficiency of the distillation can be enhanced by employing reduced pressure and/or an inert stripping gas (for example nitrogen) and/or an entraining agent (for example water or inert organic solvent). In addition, the reduction of the volatile constituents can also be achieved by vacuum stripping in a packed column, where steam or nitrogen are typically used as the stripping gas. A preferred process for thermal reduction of the volatile constituents is, for example, the two-stage process described in European patent application no. 14175603.1, with a cleaning apparatus comprising an evaporation unit and an inert gas-operated stripping column connected thereto downstream.

The polyether carbonate polyols obtained in accordance with the invention have a functionality, for example, of at least 1, preferably of 1 to 8, more preferably of 1 to 6 and most preferably of 2 to 4. The molecular weight is preferably 400 to 10 000 g/mol and more preferably 500 to 6000 g/mol.

DMC catalysts for use in the homopolymerization of alkylene oxides are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations, such that a removal of the catalyst from the finished product is generally not required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

The DMC catalysts are preferably obtained by (i) reacting an aqueous solution of a metal salt with the aqueous solution of a metal cyanide salt in the presence of one or more organic complex ligands, e.g. an ether or alcohol, in a first step, (ii) in the second step separating the solids from the suspension obtained in (i) by known techniques (such as centrifugation or filtration), (iii) in a third step optionally washing the isolated solids with an aqueous solution of an organic complex ligand (for example by resuspension and subsequently reisolation by filtration or centrifugation),
(iv) then drying the solids obtained at temperatures of generally 20-120° C. and at pressures of generally 0.1 mbar to standard pressure (1013 mbar), optionally after pulverizing, and by, in the first step or immediately after the precipitation of the double metal cyanide compound (second step), adding one or more organic complex ligands, preferably in excess (based on the double metal cyanide compound) and optionally further complex-forming components.

The double metal cyanide compounds present in the DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and dimethoxyethane (glyme) or tert-butanol (preferably in excess based on zinc hexacyanocobaltate) is then added to the suspension formed.

Metal salts suitable for preparation of the double metal cyanide compounds preferably have the general formula (II)

$$M(X)_n \quad (II)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and
n is 2 when X=halide, hydroxide, carboxylate, cyanate, thiocyanate, isocyanate, isothiocyanate or nitrate,
or suitable metal salts have the general formula (III)

$$M_r(X)_3 \quad (III)$$

where
M is selected from the metal cations $Fe^{3+}$, $Al^{3+}$, $Co^{3+}$ and $Cr^{3+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and
r is 1 when X=halide, hydroxide, carboxylate, cyanate, thiocyanate, isocyanate, isothiocyanate or nitrate,
or suitable metal salts have the general formula (IV)

$$M(X)_s \quad (IV)$$

where
M is selected from the metal cations $Mo^{4+}$, $V^{4+}$ and $W^{4+}$,
X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and
s is 4 when X=halide, hydroxide, carboxylate, cyanate, thiocyanate, isocyanate, isothiocyanate or nitrate,
or suitable metal salts have the general formula (V)

$$M(X)_t \quad (V)$$

where
M is selected from the metal cations $Mo^{6+}$ and $W^{6+}$,
X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \quad (VI)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, the values for a, b and c being selected so as to assure electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of the general formula (VII)

$$M_x[M'_{x'}(CN)_y]_z \quad (VII)$$

in which M is defined as in formulae (II) to (V) and
M' is as defined in formula (VI), and
x, x', y and z are integers and are chosen so as to assure electronic neutrality of the double metal cyanide compound.
Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No.

5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-Butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds of the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally used in the preparation of the DMC catalysts are one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, $\alpha,\beta$-unsaturated carboxylic esters or ionic surface- or interface-active compounds.

Preferably, in the preparation of the DMC catalysts, in the first step, the aqueous solutions of the metal salt (e.g. zinc chloride), used in a stoichiometric excess (at least 50 mol %) based on metal cyanide salt (i.e. at least a molar ratio of metal salt to metal cyanide salt of 2.25:1.00), and of the metal cyanide salt (e.g. potassium hexacyanocobaltate) are converted in the presence of the organic complex ligand (e.g. tert-butanol), forming a suspension containing the double metal cyanide compound (e.g. zinc hexacyanocobaltate), water, excess metal salt and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solids (i.e. the precursor of the catalyst of the invention) are isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, it is possible to remove, for example, water-soluble by-products such as potassium chloride from the catalyst. Preferably, the amount of the organic complex ligand in the aqueous wash solution is between 40% and 80% by weight, based on the overall solution.

Optionally, in the third step, further complex-forming component is added to the aqueous wash solution, preferably in the range between 0.5% and 5% by weight, based on the overall solution.

It is moreover advantageous to wash the isolated solids more than once. It is preferable when said solids are washed with an aqueous solution of the organic complex ligand (for example with an aqueous solution of the unsaturated alcohol) in a first wash step (iii-1) (for example by resuspension and subsequent reisolation by filtration or centrifugation), in order thus to remove, for example, water-soluble by-products such as potassium chloride from the catalyst. It is particularly preferable when the amount of the organic complex ligand (for example unsaturated alcohol) in the aqueous wash solution is between 40 and 80% by weight, based on the overall solution in the first wash step. In the further wash steps (iii-2) the first wash step is either repeated one or more times, preferably one to three times, or, preferably, a nonaqueous solution, for example a mixture or solution of organic complex ligands (for example unsaturated alcohol) and a further complex-forming component (preferably in the range between 0.5% and 5% by weight, based on the total amount of the wash solution in step (iii-2)), is used as a wash solution to wash the solids one or more times, preferably one to three times.

The isolated and possibly washed solids are subsequently dried at temperatures of in general 20-100° C. and at pressures of in general 0.1 mbar to atmospheric pressure (1013 mbar), optionally after pulverizing.

A preferred process for isolation of the DMC catalysts from the suspension by filtration, filtercake washing and drying is described in WO-A 01/80994.

After performance of the process of the invention for preparing the polyether carbonate polyol, the resulting reaction mixture generally comprises the DMC catalyst in the form of finely dispersed solid particles. It may therefore be desirable to remove as much as possible of the DMC catalyst from the resulting reaction mixture. The removal of the DMC catalyst has the advantage that the resulting polyether carbonate polyol achieves industry- or certification-relevant limits for example in terms of metal contents or in terms of other emissions resulting from activated catalyst remaining in the product and also facilitates recovery of the DMC catalyst.

The DMC catalyst may be removed very substantially or completely using various methods. The DMC catalyst can be separated from the polyether carbonate polyol, for example, using membrane filtration (nanofiltration, ultrafiltration or crossflow filtration), using cake filtration, using precoat filtration or by centrifugation.

Preferably, removal of the DMC catalyst is accomplished by a multistage process consisting of at least two steps.

For example, in a first step, the reaction mixture to be filtered is divided in a first filtration step into a larger substream (filtrate) in which a majority of the catalyst or all the catalyst has been removed, and a smaller residual stream (retentate) comprising the catalyst removed. In a second step, the residual stream is then subjected to a dead end filtration. This affords a further filtrate stream in which a majority of the catalyst or all the catalyst has been removed, and a damp to very substantially dry catalyst residue.

Alternatively, the catalyst present in the polyether carbonate polyol can be subjected in a first step to an adsorption, agglomeration/coagulation and/or flocculation, followed by, in a second step or a plurality of subsequent steps, the separation of the solid phase from the polyether carbonate polyol. Suitable adsorbents for mechanical-physical and/or chemical adsorption include activated or non-activated aluminas and bleaching earths (sepiolite, montmorillonite, talc etc.), synthetic silicates, activated carbon, siliceous earths/kieselguhrs and activated siliceous earths/kieselguhrs in amounts typically ranging from 0.1% by weight to 2% by weight, preferably 0.8% by weight to 1.2% by weight, based on the polyether carbonate polyol, at temperatures of from 60° C. to 140° C., preferably 90° C. to 110° C., and with residence times of 20 min to 100 min, preferably 40 min to 80 min, it being possible to conduct the adsorption step, including the mixing-in of the adsorbent, in batchwise or continuous mode.

A preferred process for removing this solid phase (consisting, for example, of adsorbent and DMC catalyst) from the polyether carbonate polyol is precoat filtration. In this method, depending on the filtration characteristics, which are determined by the particle size distribution of the solid phase to be removed, by the mean specific resistance of the resulting filtercake and by the total resistance of the precoat layer and filtercake, the filter surface is "pre-coated" with a permeable filtration aid (for example inorganic: Celite, perlite; organic: cellulose) having a layer thickness of 20 mm to 250 mm, preferably 100 mm to 200 mm. The majority of the solid phase (consisting, for example, of adsorbent and DMC catalyst) is removed at the surface of the precoat layer in combination with depth filtration of the smaller particles within the precoat layer. The temperature of the crude product to be filtered is generally in the range from 50° C. to 120° C., preferably 70° C. to 100° C.

In order to ensure a sufficient flow of product through the precoat layer and the cake layer growing thereon, the cake layer and a small part of the precoat layer may be removed (periodically or continuously) using a scraper or blade and removed from the process. This scraper/blade is moved at minimal advance rates of about 20 μm/min-500 μm/min, preferably in the range of 50 μm/min-150 μm/min.

As soon as the precoat layer has been very substantially or completely removed by this process, the filtration is stopped and a new precoat layer is applied to the filter surface. In this case, the filtration aid may be suspended, for example, in cyclic propylene carbonate.

This precoat filtration is typically conducted in vacuum drum filters. In order to achieve industrially relevant filtrate throughputs in the range from 0.1 m$^3$/(m$^2$·h) to 5 m$^3$/(m$^2$·h) in the case of a viscous feed stream, the drum filter may also be executed as a pressure drum filter with pressure differentials of up to 6 bar or more between the medium to be filtered and the filtrate side.

In principle, the DMC catalyst may be removed from the resulting reaction mixture in the process of the invention either before removal of volatile constituents (for example cyclic propylene carbonate) or after the removal of volatile constituents.

In addition, the separation of the DMC catalyst from the resulting reaction mixture from the process of the invention may be conducted with or without the further addition of a solvent (especially cyclic propylene carbonate) for the purpose of lowering the viscosity before or during the individual steps of catalyst removal described.

As well as the DMC catalysts based on zinc hexacyanocobaltate ($Zn_3[Co(CN)_6]_2$) that are used with preference, it is also possible to use other metal complex catalysts based on the metals zinc and/or cobalt that are known to those skilled in the art from the prior art for the copolymerization of epoxides and carbon dioxide for the process of the invention. This includes in particular so-called zinc glutarate catalysts (described, for example, in M. H. Chisholm et al., Macromolecules 2002, 35, 6494), so-called zinc diiminate catalysts (described, for example, in S. D. Allen, J. Am. Chem. Soc. 2002, 124, 14284), so-called cobalt salen catalysts (described, for example, in U.S. Pat. No. 7,304,172 B2, US 2012/0165549 A1) and bimetallic zinc complexes having macrocyclic ligands (described, for example, in M. R. Kember et al., Angew. Chem., Int. Ed., 2009, 48, 931).

The polyether carbonate polyols obtainable by the process of the invention have a low content of by-products and can be processed without difficulty, especially by reaction with di- and/or polyisocyanates to afford polyurethanes, in particular flexible polyurethane foams. One preferred embodiment of the invention accordingly had for its object the provision of polyether carbonate polyols which not only exhibit a very low cyclic carbonate content after thermal stress but are also suitable for production of flexible polyurethane foams. For polyurethane applications, it is preferable to use polyether carbonate polyols based on an H-functional starter substance having a functionality of at least 2.

In addition, the polyether carbonate polyols obtainable by the process of the invention can be used in applications such as washing and cleaning composition formulations, drilling fluids, fuel additives, ionic and nonionic surfactants, lubricants, process chemicals for papermaking or textile manufacture, or cosmetic formulations.

The person skilled in the art is aware that, depending on the respective field of use, the polyether carbonate polyols to be used have to fulfill certain physical properties, for example molecular weight, viscosity, functionality and/or hydroxyl number.

In a first embodiment, the invention thus relates to a process for preparing polyether carbonate polyols by addition of alkylene oxides and carbon dioxide onto H-functional starter substance in the presence of a double metal cyanide (DMC) catalyst or in the presence of a metal complex catalyst based on the metals zinc and/or cobalt, wherein
 (γ) alkylene oxide and carbon dioxide are added onto H-functional starter substance in a reactor at a total (absolute) pressure of 5 to 120 bar in the presence of a double metal cyanide catalyst or in the presence of a metal complex catalyst based on the metals zinc and/or cobalt to obtain a reaction mixture comprising the polyether carbonate polyol,
 (δ) the reaction mixture obtained in step (γ) remains in the reactor or is optionally transferred continuously into a postreactor at an initial total (absolute) pressure of 5 to 120 bar, wherein the content of free alkylene oxide in the reaction mixture is reduced in each case by way of a postreaction, and wherein the total (absolute) pressure during step (δ) can decrease by up to 50%, and (ζ) the content of readily volatile constituents in the reaction mixture obtained is thermally reduced at a temperature of 80° C. to 200° C., characterized in that (ε) prior to step (ζ), the reaction mixture resulting from step (δ) is brought to a total (absolute) pressure of ≤2.0 bar, preferably 0.5 bar to 2.0 bar, more preferably 0.9 bar to 1.1 bar, and then held at a temperature of 80 to 180° C. for a residence time of at least 0.5 h, and after this residence time has elapsed 5 to 100 ppm of component K is added to the resulting mixture, where component K is selected from at least one compound containing a phosphorus-oxygen-hydrogen group.

In a second embodiment, the invention relates to a process according to the first embodiment, wherein, in step (ε), the reaction mixture prior to step (ζ) is held at a temperature of 80 to 180° C. for a residence time of 1.0 h to 20 h, and after this residence time has elapsed 5 to 100 ppm of component K is added to the resulting mixture.

In a third embodiment, the invention relates to a process according to the first embodiment, wherein, in step (ε), the reaction mixture prior to step (ζ) is held at a temperature of 80 to 180° C. for a residence time of 1.0 h to 20 h, and after this residence time has elapsed 5 to 75 ppm of component K is added to the resulting mixture.

In a fourth embodiment, the invention relates to a process according to the first embodiment, wherein, in step (ε), the reaction mixture prior to step (ζ) is held at a temperature of 100 to 160° C. for a residence time of 1.0 h to 20 h, and after this residence time has elapsed 5 to 100 ppm of component K is added to the resulting mixture.

In a fifth embodiment, the invention relates to a process according to the first embodiment, wherein, in step (ε), the reaction mixture prior to step (ζ) is held at a temperature of 100 to 160° C. for a residence time of 2.0 h to 10 h, and after this residence time has elapsed 5 to 75 ppm of component K is added to the resulting mixture.

In a sixth embodiment, the invention relates to a process according to any of embodiments 1 to 5, wherein component K, in addition to step (ε), is added during step (δ) at a free alkylene oxide content of 1 g/L to 10 g/L alkylene oxide.

In a seventh embodiment, the invention relates to a process according to any of the embodiments 1 to 6, wherein prior to step (γ)

(β) activation is accomplished by adding a portion (based on the total amount of the alkylene oxides used in the activation and copolymerization) of alkylene oxide to a mixture of H-functional starter substance and DMC catalyst or to a mixture of suspension medium and DMC catalyst, wherein this addition of the portion of alkylene oxide can optionally be effected in the presence of $CO_2$, in which case the temperature peak ("hotspot") that occurs owing to the subsequent exothermic chemical reaction and/or a pressure drop in the reactor is awaited in each case, and wherein activation step (β) can also be effected repeatedly.

In an eighth embodiment, the invention relates to a process according to any of the embodiments 1 to 7, wherein in a first step (α) the H-functional starter substance or a suspension medium is initially charged and any water and/or other readily volatile compounds are removed by elevated temperature and/or reduced pressure ("drying"), wherein the DMC catalyst is added to the H-functional starter substance or to the suspension medium before or after the drying.

In a ninth embodiment, the invention relates to a process according to any of embodiments 1 to 8, wherein in step (γ) alkylene oxide, H-functional starter substance and DMC catalyst are continuously metered into the reactor during the reaction in the presence of carbon dioxide and the resulting reaction mixture is continuously removed from the reactor.

In a tenth embodiment the invention relates to a process according to any of embodiments 1 to 9, wherein component K is selected from at least one compound of the group consisting of phosphoric acid, mono- and dialkyl esters of phosphoric acid, mono- and diaryl esters of phosphoric acid, mono- and dialkaryl esters of phosphoric acid, $(NH_4)_2HPO_4$, phosphonic acid, monoalkyl esters of phosphonic acid, monoaryl esters of phosphonic acid, monoalkaryl esters of phosphonic acid, phosphorous acid, mono- and dialkyl esters of phosphorous acid, mono- and diaryl esters of phosphorous acid, mono- and dialkaryl esters of phosphorous acid and phosphinic acid.

In an eleventh embodiment, the invention relates to a process according to any of embodiments 1 to 10, wherein component K is selected from at least one compound from the group consisting of phosphoric acid, phosphonic acid and phosphinic acid.

In a twelfth embodiment, the invention relates to a process according to any of embodiments 1 to 11, wherein component K is phosphoric acid.

In a thirteenth embodiment, the invention relates to a process according to any of embodiments 1 to 12, wherein the H-functional starter substance is selected from at least one of the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3, and polyether polyols having a molecular weight Mn in the range from 150 to 8000 g/mol with a functionality of 2 to 3.

In a fourteenth embodiment, the invention relates to a process according to any of embodiments 1 to 13, wherein in step (δ) the reaction mixture obtained in step (γ) is transferred continuously into a postreactor, wherein the postreactor is a tubular reactor.

In a fifteenth embodiment, the invention relates to a process according to any of embodiments 1 to 14, wherein in step (δ) the reaction mixture obtained in step (γ) is transferred continuously into a postreactor, wherein the free alkylene oxide content is reduced to less than 0.5 g/L by way of postreaction.

In a sixteenth embodiment, the invention relates to a process according to any of the embodiments 1 to 15, wherein (α) a portion of the H-functional starter substance and/or suspension medium containing no H-functional groups is initially charged in a reactor, in each case optionally together with DMC catalyst, (β) a portion of alkylene oxide is added to the mixture from step (α) at temperatures of 90 to 150° C., and wherein the addition of the alkylene oxide compound is then stopped, (γ) alkylene oxide and carbon dioxide are added onto H-functional starter substance in a reactor at a total (absolute) pressure of 5 to 120 bar in the presence of a double metal cyanide catalyst or in the presence of a metal complex catalyst based on the metals zinc and/or cobalt to obtain a reaction mixture comprising the polyether carbonate polyol, (δ) the reaction mixture obtained in step (γ) remains in the reactor or is optionally transferred continuously into a postreactor at an initial total (absolute) pressure of 5 to 120 bar, wherein the content of free alkylene oxide in the reaction mixture is reduced in each case by way of a postreaction, and wherein the total (absolute) pressure during step (δ) can decrease by up to 50%, and (ζ) the content of readily volatile constituents in the reaction mixture obtained is thermally reduced at a temperature of 80° C. to 200° C., characterized in that (ε) prior to step (ζ), the reaction mixture resulting from step (δ) is brought to a total (absolute) pressure of ≤2.0 bar, preferably 0.5 bar to 2.0 bar, more preferably 0.9 bar to 1.1 bar, and then held at a temperature of 80 to 180° C. for a residence time of at least 0.5 h, preferably of 1.0 h to 20 h, more preferably 2.0 h to 10 h, and after this residence time has elapsed 5 to 100 ppm, preferably 5 ppm to 75 ppm, more preferably 10 ppm to 50 ppm, of component K is added to the resulting mixture, where component K is selected from at least one compound containing a phosphorus-oxygen-hydrogen group.

In a seventeenth embodiment, the invention relates to a process for preparing polyether carbonate polyols by addition of alkylene oxides and carbon dioxide onto H-functional starter substance in the presence of a double metal cyanide (DMC) catalyst or in the presence of a metal complex catalyst based on the metals zinc and/or cobalt, wherein (α) a portion of the H-functional starter substance and/or suspension medium containing no H-functional groups is initially charged in a reactor, in each case optionally together with DMC catalyst, (β) a portion of alkylene oxide is added to the mixture from step (α) at temperatures of 90 to 150° C., and wherein the addition of the alkylene oxide compound is then stopped, (γ) alkylene oxide and carbon dioxide are added onto H-functional starter substance in a reactor at a total (absolute) pressure of 5 to 120 bar in the presence of a double metal cyanide catalyst or in the presence of a metal complex catalyst based on the metals zinc and/or cobalt to obtain a reaction mixture comprising the polyether carbonate polyol, (δ) the reaction mixture obtained in step (γ) remains in the reactor or is optionally transferred continuously into a postreactor, wherein the content of free alkylene oxide in the reaction mixture is reduced in each case by way of a postreaction, and wherein the total (absolute) pressure during step (δ) can decrease by up to 50%, (ε) the reaction mixture obtained in step (δ), prior to step (ζ), is brought to a total (absolute) pressure of ≤2.0 bar, preferably 0.5 bar to 2.0 bar, more preferably 0.9 bar to 1.1 bar, and then held at a temperature of 80 to 180° C., preferably 100 to 160° C., more preferably 105 to 145° C., for a residence time of at least 0.5 h, preferably of 1.0 h to 20 h, more preferably 2.0 h to 10 h, and after this residence time has elapsed 5 to 100 ppm, preferably 5 ppm to 75 ppm, more preferably 10 ppm to 50 ppm, of component K is added to the resulting mixture, where component K is selected from at least one compound containing a phosphorus-oxygen-hydrogen group, and (ζ) the content of readily volatile constituents in the reaction mixture obtained is thermally reduced at a temperature of 80° C. to 200° C.

In an eighteenth embodiment the invention relates to polyether carbonate polyols obtainable according to any of embodiments 1 to 17.

In a nineteenth embodiment, the invention relates to a polyether carbonate polyol mixture comprising polyether carbonate polyol and component K, wherein the polyether carbonate polyol is characterized in that at least 98 mol % of the polyether carbonate polyol end groups consist of a terminal block of at least two alkylene oxide units in each case, and wherein component K is selected from at least one compound containing a phosphorus-oxygen-hydrogen group.

EXAMPLES

The OH number was determined by the method of DIN 53240. The unit expressed as "mg/g" relates to mg[KOH]/g[polyether carbonate polyol].

The proportion of $CO_2$ incorporated in the resulting polyether carbonate polyol and the ratio of propylene carbonate (cyclic carbonate) to polyether carbonate polyol were determined by means of $^1$H NMR (Bruker DPX 400, 400 MHz; zg30 pulse program, relaxation delay d1: 10 s, 64 scans). Each sample was dissolved in deuterated chloroform. The relevant resonances in the $^1$H NMR (based on TMS=0 ppm) are as follows:

Cyclic carbonate (which was formed as a by-product) resonance at 4.5 ppm, linear carbonate resulting from carbon dioxide incorporated in the polyether carbonate polyol (resonances at 5.1 to 4.8 ppm), unreacted propylene oxide (PO) with resonance at 2.4 ppm, polyether polyol (i.e. without incorporated carbon dioxide) with resonances at 1.2 to 1.0 ppm, any octane-1,8-diol incorporated as starter molecule with a resonance at 1.6 to 1.52 ppm.

The mole fraction of the carbonate incorporated in the polymer in the reaction mixture is calculated as per formula (VIII) as follows, the following abbreviations being used:

A(4.5)=area of the resonance at 4.5 ppm for cyclic carbonate (corresponds to one hydrogen atom)

A(5.1-4.8)=area of the resonance at 5.1-4.8 ppm for polyether carbonate polyol and one hydrogen atom for cyclic carbonate A(2.4)=area of the resonance at 2.4 ppm for free, unreacted PO A(1.2-1.0)=area of the resonance at 1.2-1.0 ppm for polyether polyol A(1.6-1.52)=area of the resonance at 1.6 to 1.52 ppm for any octane-1,8-diol used (starter)

Taking account of the relative intensities, the values for the polymer-bound carbonate ("linear carbonate" LC) in the reaction mixture were converted to mol % as per the following formula (VIII):

$$LC = \frac{A(5.1-4.8) - A(4.5)}{A(5.1-4.8) + A(2.4) + 0.33 * A(1.2-1.0) + 0.25 * A(1.6-1.52)} * 100 \qquad \text{(VIII)}$$

The proportion by weight (in % by weight) of polymer-bound carbonate (LC') in the reaction mixture was calculated by formula (IX):

$$LC' = \frac{[A(5.1-4.8) - A(4.5)] * 102}{D} * 100\% \qquad (IX)$$

where the value of D ("denominator" D) is calculated by formula (X):

$$D = [A(5.1-4.8) - A(4.5)]*102 + A(4.5)*102 + A(2.4)*58 + 0.33*A(1.2-1.0)*58 + 0.25*A(1.6-1.52)*146 \qquad (X)$$

The factor of 102 results from the sum total of the molar masses of $CO_2$ (molar mass 44 g/mol) and of propylene oxide (molar mass 58 g/mol); the factor of 58 results from the molar mass of propylene oxide and the factor of 146 results from the molar mass of any octane-1,8-diol starter used.

The proportion by weight (in % by weight) of cyclic carbonate (CC') in the reaction mixture was calculated by formula (XI):

$$CC' = \frac{A(4.5)*102}{D} * 100\% \qquad (XI)$$

where the value of D is calculated by formula (X).

In order to use the values for the composition of the reaction mixture to calculate the composition based on the polymer component (composed of polyether polyol which has been formed from starter and polyether carbonate polyol which has been formed from starter, propylene oxide and carbon dioxide during the copolymerization), the nonpolymeric constituents of the reaction mixture (i.e. cyclic propylene carbonate and any unconverted propylene oxide present) were mathematically eliminated. The weight fraction of the repeat carbonate units in the polyether carbonate polyol was converted to a proportion by weight of carbon dioxide using the factor F=44/(44+58). The figure for the $CO_2$ content in the polyether carbonate polyol ("$CO_2$ incorporated"; see examples which follow) has been normalized to the proportion of the polyether carbonate polyol molecule that does not consist of the starter.

The analysis of the end group 1 (O(CO)O$\underline{C}$H$_2$—CH(OH)CH$_3$) with secondary OH was effected by means of quantitative $^{13}$C NMR spectroscopy, resulting in the chemical shifts of the end group 1 as follows: O(CO)O$\underline{C}$H$_2$—CH(OH)CH$_3$: 72.8 ppm, O(CO)OCH$_2$—$\underline{C}$H(OH)CH$_3$: 65.5 ppm and O(CO)OCH$_2$—CH(OH)$\underline{C}$H$_3$: 18.9 ppm.

Raw Materials Used:

Polyether carbonate polyol: polyether carbonate polyol having an OH functionality=2.8, an OH number=56 mg KOH/g and a $CO_2$ content=20% by weight DMC catalyst: a dried and ground DMC catalyst (double metal cyanide catalyst) prepared according to example 6 of WO 2001/80994 A1

Glycerol: from Aug. Hedinger GmbH & Co. KG

Propylene glycol: from Aug. Hedinger GmbH & Co. KG

Examples 1 to 17 (General Procedure)

Step (γ):

A continuously operated 60 L pressure reactor with gas metering unit and product discharge tube was initially charged with 32.9 L of a polyether carbonate polyol (OH functionality=2.8; OH number=56 mg KOH/g; $CO_2$ content=20% by weight) containing 200 ppm of DMC catalyst. At a temperature of 108° C. and a total pressure of 66 bar (absolute), the following components were metered at the metering rates specified while stirring (9 Hz):

propylene oxide at 6.56 kg/h carbon dioxide at 2.2 kg/h mixture of glycerol/propylene glycol (85% by weight/15% by weight) containing 0.69% by weight of DMC catalyst (unactivated) and 146 ppm (based on the mixture of glycerol, propylene glycol and DMC catalyst) of $H_3PO_4$ (used in the form of an 85% aqueous solution) at 0.254 kg/h.

The reaction mixture was withdrawn continuously from the pressure reactor via the product discharge tube, such that the reaction volume (32.9 L) was kept constant, with a mean residence time of the reaction mixture in the reactor of 200 min.

Step (δ):

To complete the reaction, the reaction mixture withdrawn was transferred into a postreactor (tubular reactor having a reaction volume of 2.0 L) which had been heated to 120° C. The mean residence time of the reaction mixture in the postreactor was 12 min. The product was then decompressed to atmospheric pressure and then 500 ppm of Irganox® 1076 antioxidant were added.

Step (ε):

Following step (δ), the product was brought to the desired temperature T by means of a heat exchanger and immediately thereafter transferred to a 332 L tank and kept at the temperature T for the residence time t; the temperature T and residence time t employed in each example are reported in table 1.

On conclusion of the residence time t, the product was admixed with the amount M of phosphoric acid (component K) specified in table 1.

Step (ζ):

Finally, the product, for removal of the cyclic propylene carbonate, was subjected to a two-stage thermal workup, namely in a first stage by means of a falling-film evaporator, followed, in a second stage, by a stripping column operated in a nitrogen countercurrent.

The falling-film evaporator was operated here at a temperature of 160° C. and a pressure of 10 mbar (absolute). The falling-film evaporator used consisted of glass with an exchange area of 0.5 m². The apparatus had an externally heated tube with a diameter of 115 mm and a length of about 1500 mm.

The nitrogen stripping column was operated at a temperature of 160° C., a pressure of 80 mbar (absolute) and a nitrogen flow rate of 0.6 kg N$_2$/kg product. The stripping column used was a DN80 glass column filled to a height of 8 m with random packings (Raschig #0.3 Super-Rings).

The OH number, the content of carbon dioxide incorporated and the cyclic propylene carbonate content were determined in the polyether carbonate polyols obtained after step (ζ).

To ascertain the thermal storage stability of the polyether carbonate polyols, these polyether carbonate polyols obtained after step (ζ) were stored at 100° C. for 66 hours. Subsequently, the cyclic propylene carbonate content in the polyether carbonate polyols thus stored was measured ("storage test").

Table 1 states:
- the residence times (DT t) and temperatures (Temp. T) during the residence time,
- the amount of phosphoric acid added (Amount M $H_3PO_4$),
- the OH number (OHN) of the polyether carbonate polyols obtained,
- the content of carbon dioxide ($CO_2$) incorporated into the polyether carbonate polyols,
- the cyclic propylene carbonate content after the thermal workup (cPC) and
- the cyclic propylene carbonate content after storage at 100° C. for 66 hours (cPC @66 h/100° C.).

regard to the duration of the residence time (step (ε)), over and above a residence time of 5 h, an order of magnitude of cPC content was attained after the storage test which remained at about the same level even in the case of a further-prolonged residence time (examples 1 to 9); the result was therefore an optimal space-time yield in the residence time range of 2.0 h to 10 h.

Comparative example 15 demonstrates that, without component K, the polyether carbonate polyols obtained have a much lower thermal stability than polyether carbonate polyols containing component K (example 10). Comparative example 16, by comparison with example 10, shows that, in the case of addition of component K above the range from 5 to 100 ppm, the polyether carbonate polyols obtained have much lower thermal stability. Comparative example 17, by comparison with example 10, shows that, in the case of performance of step (ε) below 80° C., the polyether carbonate polyols obtained have much lower thermal stability.

Examples 18 to 20

Examples 18 to 20 were conducted according to the above-specified general procedure, with variation of the total pressure in the 60 L pressure reactor:

Example 18: 26 bar (absolute)
Example 19: 31 bar (absolute)

TABLE 1

| Example | DT t (h) | Temp. T (° C.) | Amount M $H_3PO_4$ (ppm) | OHN (mg KOH/g) | $CO_2$ (% by wt.) | cPC (ppm) | cPC@66 h/ 100° C. (ppm) |
|---|---|---|---|---|---|---|---|
| 1 *) | 0 | 108 | 31 | 56 | 20.0 | 112 | 604 |
| 2 | 0.5 | 108 | 38 | 58 | 20.3 | 13 | 303 |
| 3 | 2 | 108 | 37 | 57 | 20.3 | 11 | 105 |
| 4 | 3 | 108 | 40 | 57 | 20.3 | 13 | 104 |
| 5 | 4 | 108 | 40 | 57 | 20.2 | 12 | 107 |
| 6 | 5 | 108 | 30 | 57 | 20.3 | 23 | 65 |
| 7 | 6 | 108 | 38 | 58 | 20.1 | 7 | 51 |
| 8 | 10 | 108 | 34 | 57 | 20.0 | 11 | 46 |
| 9 | 13 | 108 | 31 | 57 | 20.0 | 14 | 75 |
| 10 | 4 | 120 | 32 | 58 | 20.0 | 7 | 37 |
| 11 | 6 | 120 | 10 | 58 | 19.7 | 4 | 56 |
| 12 | 10 | 120 | 36 | 57 | 20.0 | 7 | 26 |
| 13 | 4 | 140 | 32 | 57 | 19.9 | 7 | 33 |
| 14 | 6 | 140 | 17 | 58 | 19.7 | 11 | 43 |
| 15* | 4 | 120 | 0 | 56 | 20.1 | 50 | 113 |
| 16* | 4 | 120 | 125 | 58 | 20.2 | 19 | 236 |
| 17* | 4 | 55 | 32 | 57 | 19.4 | 43 | 449 |

*) comparative example; in the case of comparative example 1, in the resulting polyether carbonate polyol, the content of end group 1 ((O(CO)OCH$_2$—CH(OH)CH$_3$) with secondary OH) is 5 mol %

The examples demonstrate that, in a process in which the content of readily volatile constituents in the reaction mixture obtained is thermally reduced immediately after copolymerization and postreaction for reduction of the free alkylene oxide content (comparative example 1), the result is a high content of cyclic propylene carbonate both in the resultant polyether carbonate polyol and in the polyether carbonate polyol after the storage test.

If, by contrast, the reaction mixture, in the process of the invention (examples 2 to 14), prior to step (ζ), has been held for a residence time of at least 0.5 h and, after this residence time has elapsed, component K has been added to the resulting mixture (step (ε)), the cyclic propylene carbonate content (cPC) was lower both in the resultant polyether carbonate polyol and in the polyether carbonate polyol after the storage test than in comparative example 1. A residence time at high temperature has a favorable effect on a low cPC content (see examples 5, 10, 13 and examples 11, 14). With Example 20: 66 bar (absolute)

Table 2 states:
- the residence times (DT t) and temperatures (Temp. T) during the residence time,
- the amount of phosphoric acid added (Amount M $H_3PO_4$),
- the OH number (OHN) of the polyether carbonate polyols obtained,
- the content of carbon dioxide ($CO_2$) incorporated into the polyether carbonate polyols,
- the cyclic propylene carbonate content after the thermal workup (cPC)
- the proportion of (O(CO)OCH$_2$—CH(OH)CH$_3$) end groups with secondary OH (end group 1) in the resulting polyether carbonate polyol and
- the cyclic propylene carbonate content after storage at 100° C. for 66 hours (cPC @66 h/100° C.).

TABLE 2

| Ex. | DT t (h) | Temp. T (° C.) | Amount M $H_3PO_4$ (ppm) | OHN (mg KOH/g) | $CO_2$ (% by wt.) | cPC (ppm) | End group 1 [mol %] | cPC@66 h/ 100° C. (ppm) |
|---|---|---|---|---|---|---|---|---|
| 18 | 4 | 120 | 25 | 56 | 12.6 | 5 | <d.l. | 40 |
| 19 | 4 | 120 | 19 | 56 | 15.3 | 5 | <d.l. | 39 |
| 20 | 4 | 120 | 27 | 55 | 19.9 | 8 | <d.l. | 18 |

<d.l.: content is less than the detection limit of 2 mol %

The polyether carbonate polyols prepared in examples 18, 19 and 20 by the process of the invention differ essentially in terms of their content of carbon dioxide incorporated into the polyether carbonate polyols (12.6% to 19.9% by weight). They do not have any differences from one another with regard to thermal stress (residence time and temperature), and the amount of phosphoric acid added is similar, as are the hydroxyl number and the cyclic carbonate content (cPC content) prior to storage at 100° C. for 66 h. This combines with the fact that end group 1, i.e. (O(CO)OCH$_2$—CH(OH)CH$_3$) with secondary OH, can no longer be detected in the samples thus pretreated, and at least 98 mol % of the polyether carbonate polyol end groups consist of one terminal block of at least two alkylene oxide units in each case. By contrast, in the polyether carbonate polyol from comparative example 1 in which the content of readily volatile constituents in the reaction mixture obtained was thermally reduced immediately after copolymerization and postreaction, the measured content of end group 1 ((O(CO)OCH$_2$—CH(OH)CH$_3$) with secondary OH is 5 mol %.

The polyether carbonate polyols prepared in accordance with the invention, even after thermal storage, have only a low cyclic carbonate content; in other words, after storage at 100° C. for 66 hours, there is only a slight rise in the cyclic propylene carbonate content (examples 18, 19 and 20: to values of 18 to 40 ppm).

The invention claimed is:

1. A process for preparing polyether carbonate polyols comprising adding an alkylene oxide and carbon dioxide onto an H-functional starter substance in the presence of a double metal cyanide (DMC) catalyst or in the presence of a metal complex catalyst based on the metals zinc and/or cobalt, wherein the process comprises
   (γ) adding the alkylene oxide and carbon dioxide onto the H-functional starter substance in a reactor at a total (absolute) pressure of 5 to 120 bar in the presence of a double metal cyanide catalyst or in the presence of a metal complex catalyst based on the metals zinc and/or cobalt to obtain a reaction mixture comprising the polyether carbonate polyol,
   (δ) allowing the reaction mixture comprising the polyether carbonate polyol obtained in step (γ) in the reactor or optionally transferring the reaction mixture continuously into a postreactor at an initial total (absolute) pressure of 5 to 120 bar, wherein the content of free alkylene oxide in the reaction mixture is reduced in each case by way of a postreaction, and wherein the total (absolute) pressure during step (δ) can decrease by up to 50%, and
   (ζ) thermally reducing the content of readily volatile constituents in the reaction mixture obtained at a temperature of 80° C. to 200° C.,
   wherein:
   (ε) prior to step (ζ), the reaction mixture resulting from step (δ) is brought to a total (absolute) pressure of ≤2.0 bar and then held at a temperature of 80 to 180° C. for a residence time of at least 0.5 h, and after this residence time has elapsed, adding 5 to 100 ppm of component K to the resulting mixture, where component K comprises at least one compound containing a phosphorus-oxygen-hydrogen group.

2. The process as claimed in claim 1, wherein, in step (ε), the reaction mixture is held at a temperature of 80 to 180° C. for a residence time of 1.0 h to 20 h, and after this residence time has elapsed, from 5 to 100 ppm of component K is added to the resulting mixture.

3. The process as claimed in claim 1, wherein, in step (ε), the reaction mixture is held at a temperature of 80 to 180° C. for a residence time of 1.0 h to 20 h, and after this residence time has elapsed, from 5 to 75 ppm of component K is added to the resulting mixture.

4. The process as claimed in claim 1, wherein, in step (ε), the reaction mixture is held at a temperature of 100 to 160° C. for a residence time of 1.0 h to 20 h, and after this residence time has elapsed, from 5 to 100 ppm of component K is added to the resulting mixture.

5. The process as claimed in claim 1, wherein, in step (ε), the reaction mixture is held at a temperature of 100 to 160° C. for a residence time of 2.0 h to 10 h, and after this residence time has elapsed, from 5 to 75 ppm of component K is added to the resulting mixture.

6. The process as claimed in claim 1, wherein component K, in addition to step (ε), is added during step (δ) at a free alkylene oxide content of 1 g/L to 10 g/L alkylene oxide.

7. The process as claimed in claim 1, wherein prior to step (γ)
   (β) adding a portion (based on the total amount of the alkylene oxides used in the activation and copolymerization) of alkylene oxide to a mixture of H-functional starter substance and DMC catalyst or to a mixture of suspension medium and DMC catalyst to activate the catalyst, wherein this addition of the portion of alkylene oxide can optionally be effected in the presence of $CO_2$, and in each case awaiting the temperature peak ("hotspot") that occurs owing to the subsequent exothermic chemical reaction and/or a pressure drop in the reactor, and wherein activation step (β) can also be effected repeatedly.

8. The process as claimed in claim 1, wherein in a first step
   (α) initially charging the H-functional starter substance or a suspension medium, and removing any water and/or other readily volatile compounds by elevated temperature and/or reduced pressure ("drying"), wherein the DMC catalyst is added to the H-functional starter substance or to the suspension medium before or after the drying.

9. The process as claimed in claim 1, wherein in step (γ) alkylene oxide, H-functional starter substance and DMC catalyst are continuously metered into the reactor during the reaction in the presence of carbon dioxide and the resulting reaction mixture is continuously removed from the reactor.

10. The process as claimed in claim 1, wherein component K comprises at least one of
phosphoric acid,
mono- and/or dialkyl esters of phosphoric acid,
mono- and/or diaryl esters of phosphoric acid,
mono- and/or dialkaryl esters of phosphoric acid,
$(NH_4)_2HPO_4$,
phosphonic acid,
monoalkyl esters of phosphonic acid,
monoaryl esters of phosphonic acid,
monoalkaryl esters of phosphonic acid,
phosphorous acid,
mono- and/or dialkyl esters of phosphorous acid,
mono- and/or diaryl esters of phosphorous acid,
mono- and dialkaryl esters of phosphorous acid,
and
phosphinic acid.

11. The process as claimed in claim 1, wherein component K comprises at least one of phosphoric acid, phosphonic acid, and phosphinic acid.

12. The process as claimed in claim 1, wherein component K comprises phosphoric acid.

13. The process as claimed in claim 1, wherein the H-functional starter substance comprises at least one of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3, and polyether polyols having a molecular weight Mn in the range from 150 to 8000 g/mol with a functionality of 2 to 3.

14. The process as claimed in claim 1, wherein in step (δ) the reaction mixture obtained in step (γ) is transferred continuously into a postreactor, wherein the postreactor is a tubular reactor.

15. The process as claimed in claim 1, wherein in step (δ) the reaction mixture obtained in step (γ) is transferred continuously into a postreactor, wherein the content of free alkylene oxide is reduced to less than 0.5 g/L by way of postreaction.

* * * * *